July 14, 1931.  M. UNGER  1,814,871
TUBULAR CASING FOR ELECTRICAL APPARATUS
Filed Oct. 2, 1930
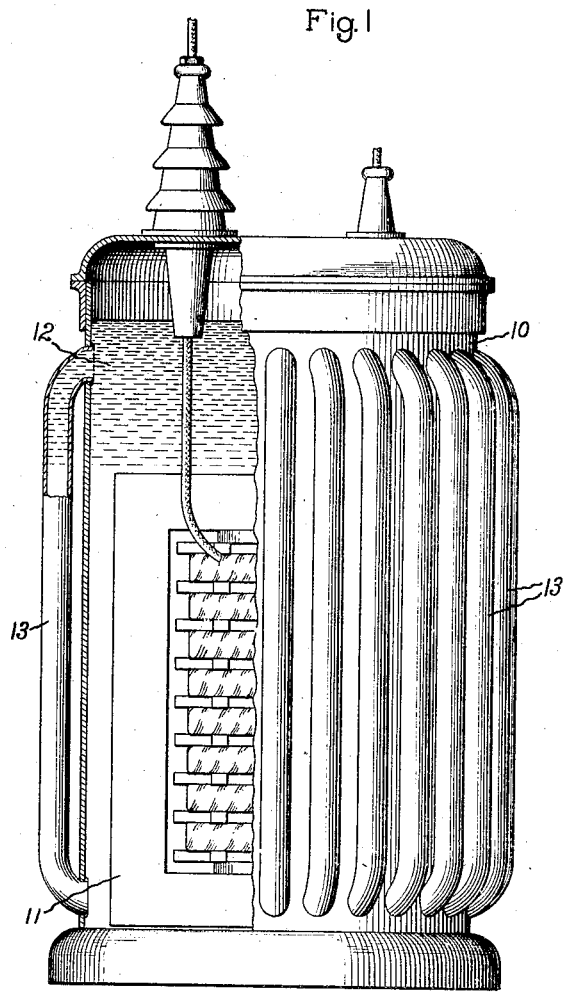
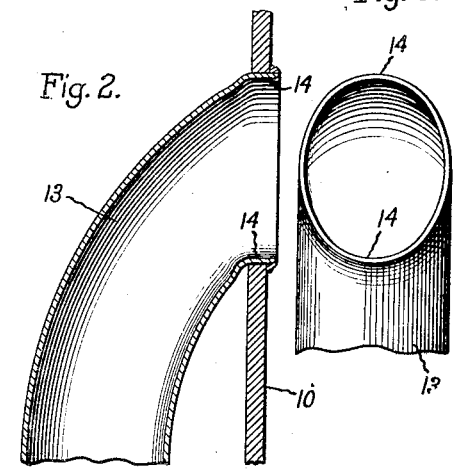
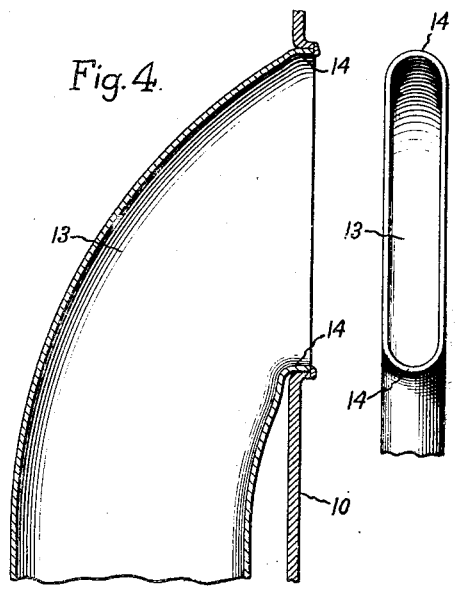
Inventor:
Magnus Unger,
by Charles E. Mullen
His Attorney.

Patented July 14, 1931

1,814,871

UNITED STATES PATENT OFFICE

MAGNUS UNGER, OF PITTSFIELD, MASSACHUSETTS, ASSIGNOR TO GENERAL ELECTRIC COMPANY, A CORPORATION OF NEW YORK

TUBULAR CASING FOR ELECTRICAL APPARATUS

Application filed October 2, 1930. Serial No. 486,030.

My invention relates to tubular casings for electrical apparatus and more particularly to tubular casings adapted to contain an insulating and cooling liquid in which the apparatus is immersed.

The operation of electrical apparatus such as transformers, reactors, induction regulators and the like results in the generation of heat in the windings and magnetic cores and this heat must be properly dissipated to prevent the occurrence of excessive temperatures. The dissipation of heat is commonly provided for by immersing the apparatus in a suitable cooling liquid within a casing or container provided with external heat radiators. The heat generated in the apparatus is absorbed by the surrounding liquid which rises by convection past the apparatus within the casing and then descends through the external radiators where it is cooled to return into the casing ready to absorb more heat.

Many forms of external radiators have been used, one of the commonest forms being simple vertical tubes arranged in one or more rows around the apparatus casing and communicating at their upper and lower ends with the upper and lower parts of the casing respectively, the ends of the tubes being welded to the edges of properly spaced openings in the casing wall. The joints between the ends of the tubes and the walls of the casing may be more easily made and they will be stronger and tighter and have a better appearance if the ends of the tubes enter the openings in the wall of the casing at right angles. Tubes have been provided with their ends bent or curved through ninety degrees so that they would enter the openings in the casing wall at right angles. It is, however, impossible to make a short sharp bend in a tube without crimping or cracking it and, if the bends are not short, the tubes extend too far from the casing and the casing with its tubes takes up too much floor space. Straight tubes have also been provided with short elbows connecting their ends to the casing wall so that the tubes are close to the casing but this arrangement requires additional joints between the elbows and the straight tubes. Other arrangements have been suggested and used but they are mostly complicated or require more than the two joints at the ends of each tube or have other undesirable features. The general object of the invention is to provide an improved tubular casing with the ends of the tubes curved or bent and welded to the casing wall but with the tubes as close to the casing as desired.

The invention will be better understood from the following description taken in connection with the accompanying drawings in which Fig. 1, shows partly in section, a tubular casing with the tubes constructed and connected to the casing in accordance with the invention, the casing containing an oil immersed transformer, Figs. 2 and 3 are enlarged detail views showing one end of a tube in section, and Figs. 4 and 5 are similar views of a different form of tube.

Like reference characters indicate similar parts in the different figures of the drawing.

The casing 10 shown in Fig. 1 of the drawing contains a transformer 11 which is immersed in a body of insulating liquid 12. The casing 10 has a row of vertical tubes 13 around its side wall and communicating with the interior of the casing at their ends which are welded to the edges of openings near the top and bottom of the casing wall. The insulating liquid 12 rises by convection past the transformer 11 from which it absorbs heat and then descends through the tubes 13 to which it gives up the heat to be dissipated into the surrounding air. The main parts of the tubes 13 are straight and parallel to the casing wall and their ends are bent to meet openings in the wall, the ends of the tubes being welded to the edges of the openings to make liquid tight joints.

The welded joints between the ends of the tubes 13 and the casing 10 may be made more conveniently and will be mechanically stronger and better appearing if the ends of the tubes meet the edges of the openings at right angles. The tubes are of metal, however, and it is not possible to bend their ends through complete right angles with short radii of curvature without splitting or otherwise injuring them. If the bends are not short, the main straight parts of the tubes will be spaced too far from the casing wall and take up unnecessary floor space which is often very valuable. The tubes have each end bent therefore through less than a right angle so that it meets the casing wall at an acute angle, the spacing of the main straight portion of each tube being smaller than the radius of curvature of its ends. The spacing of the tubes from the casing wall may be as small as desired. The extreme end edges of each tube are further bent to form integral flanges 14 at right angles to the edges of the openings in the casing wall and also to the main straight parts of the tubes themselves. These flanges 14 thus fit the edges of the openings in the casing 10 properly to permit strong tight welded joints to be easily and conveniently made. The tubes 13 may have any desired cross sectional shape. Figs. 1 and 2, for instance, show tubes which are circular in cross section and Fig. 3 shows a form of tube which is flattened.

The invention has been explained by describing and illustrating certain forms of tubes applied to a transformer casing but it will be apparent that changes may be made without departing from the spirit of the invention or the scope of the appended claims.

What I claim as new and desire to secure by Letters Patent of the United States, is:

1. The combination with an electrical apparatus casing having two openings of a heat radiating tube, the end portions of said tube being bent and meeting the casing wall at acute angles at said openings, the extreme end edges of said tube being further bent to form integral flanges extending at right angles to the casing wall, said flanges and the edges of said openings being welded together to form liquid tight joints.

2. The combination with an electrical apparatus casing having two openings of a heat radiating tube, the end portions of said tube being bent through less than right angles and meeting said casing wall at said openings, the extreme end edges of said tube being further bent to form integral flanges extending at right angles to the casing wall, said flanges and the edges of said openings being welded together to form liquid tight joints.

In witness whereof, I have hereunto set my hand this 29th day of September, 1930.

MAGNUS UNGER.